(12) United States Patent
Bedarida et al.

(10) Patent No.: US 6,724,241 B1
(45) Date of Patent: Apr. 20, 2004

(54) VARIABLE CHARGE PUMP CIRCUIT WITH DYNAMIC LOAD

(75) Inventors: Lorenzo Bedarida, Vimercate (IT); Simone Bartoli, Carbiago (IT); Stefano Sivero, Vergiate (IT)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 10/352,733

(22) Filed: Jan. 27, 2003

(30) Foreign Application Priority Data

Oct. 25, 2002 (IT) ...................................... MI2002A2268

(51) Int. Cl.[7] ................................................. G05F 1/10
(52) U.S. Cl. ...................................................... 327/536
(58) Field of Search ............................... 327/530, 534, 327/535, 536, 537

(56) References Cited

U.S. PATENT DOCUMENTS

| | | | |
|---|---|---|---|
| 4,580,067 A | 4/1986 | Proebsting et al. | 307/296 R |
| 5,363,066 A | 11/1994 | Chen et al. | 331/17 |
| 5,754,417 A * | 5/1998 | Nicollini | 363/60 |
| 6,052,015 A | 4/2000 | Desbonnets | 327/382 |
| 6,163,187 A | 12/2000 | Sano | 327/157 |
| 6,188,212 B1 | 2/2001 | Larson et al. | 323/281 |
| 6,208,197 B1 * | 3/2001 | Ternullo et al. | 327/536 |
| 6,300,839 B1 | 10/2001 | Bazargan et al. | 331/57 |
| 6,320,797 B1 | 11/2001 | Liu | 365/189.11 |
| 6,370,046 B1 | 4/2002 | Nebrigic et al. | 363/60 |
| 6,424,570 B1 | 7/2002 | Le et al. | 365/185.18 |
| 6,518,828 B2 * | 2/2003 | Seo et al. | 327/534 |
| 2002/0008567 A1 | 1/2002 | Henry | 327/536 |
| 2002/0093854 A1 | 7/2002 | Liu | 365/189.11 |

* cited by examiner

Primary Examiner—Jeffrey Zweizig
(74) Attorney, Agent, or Firm—Thomas Schneck; Mark Protsik

(57) ABSTRACT

A variable charge pump circuit uses a plurality of selectable loads to minimize the voltage ripples of the pumped output by selecting the appropriate load for a preselected pump voltage. The charge pump circuit also compares the pump voltage to a reference voltage to shut down the variable charge pump circuit if the pump voltage is larger than the reference voltage. The charge pump circuit also compares the maximum voltage output to the reference voltage to monitor whether the maximum ripple on voltage output is larger than the reference voltage. The charge pump circuit comprises one or more stages operable to receive a supply voltage and generate one or more pump voltages, a plurality of loads each associated with a specific pump voltage, and a load selector means coupled to the output pump and the plurality of loads for selecting a load associated with a specific pump voltage.

25 Claims, 7 Drawing Sheets

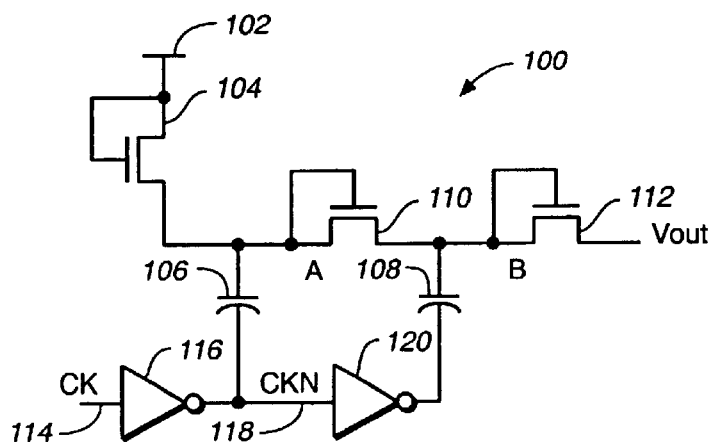
FIG._1 (PRIOR ART)
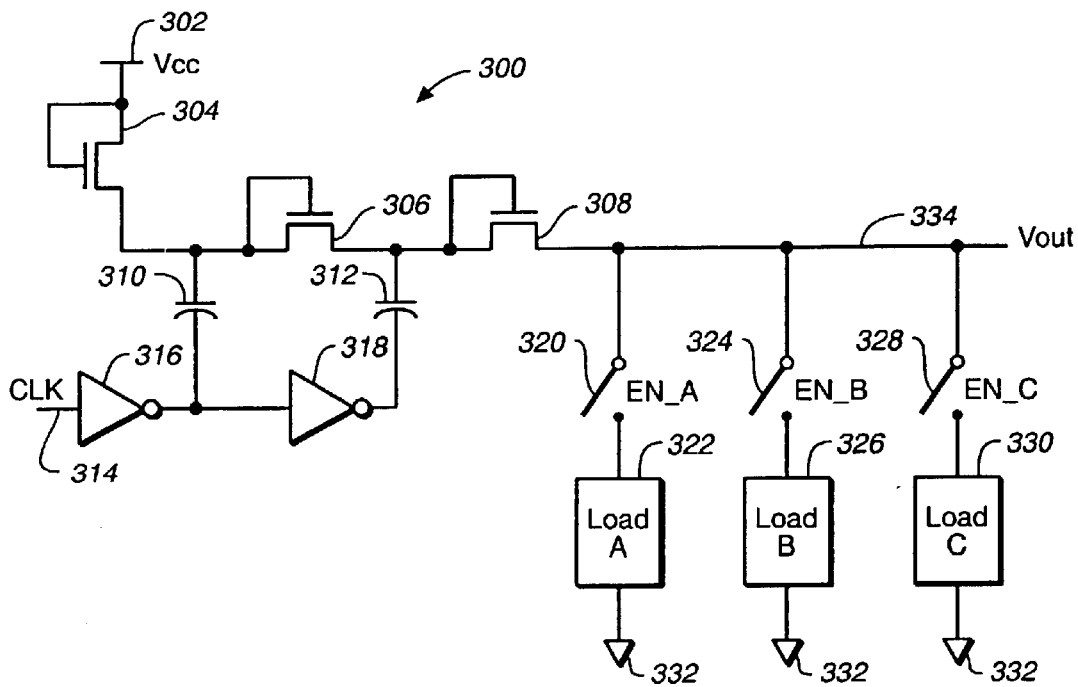
FIG._3

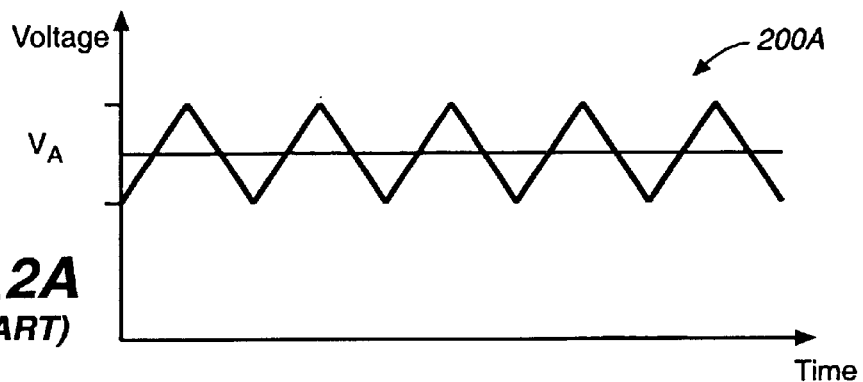
FIG._2A
*(PRIOR ART)*
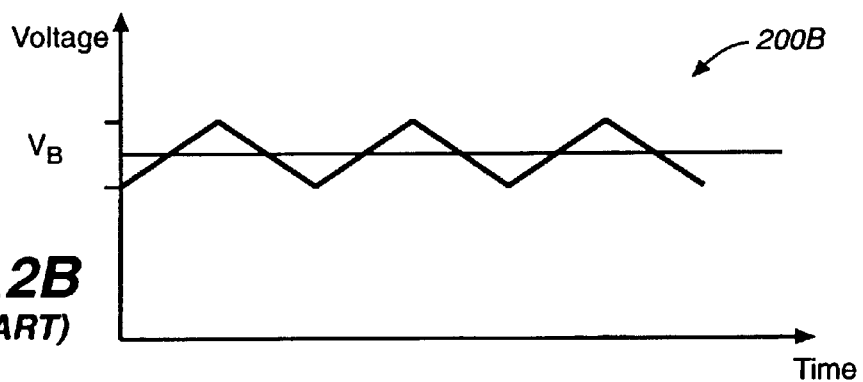
FIG._2B
*(PRIOR ART)*
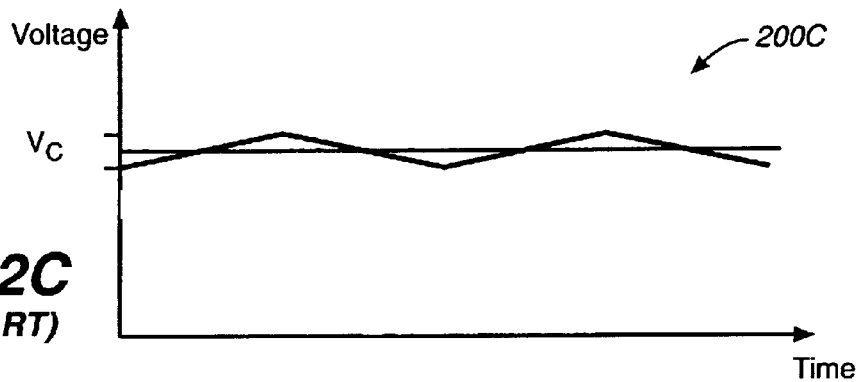
FIG._2C
*(PRIOR ART)*

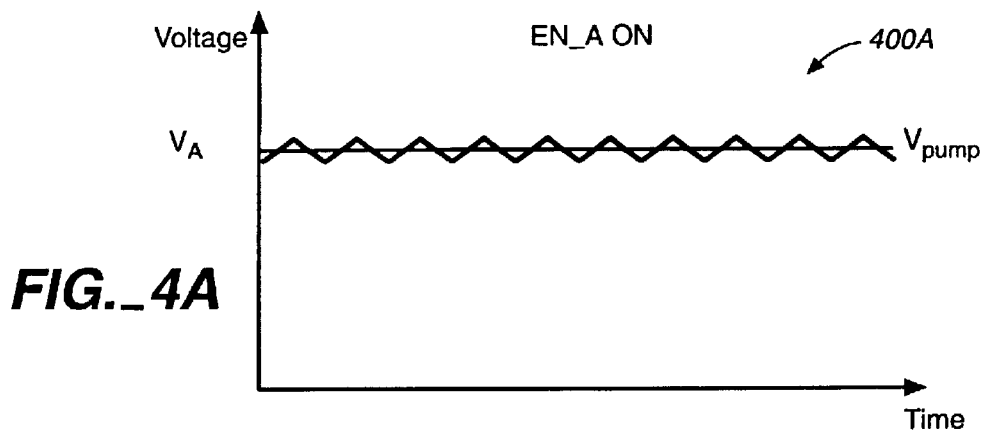
FIG._4A
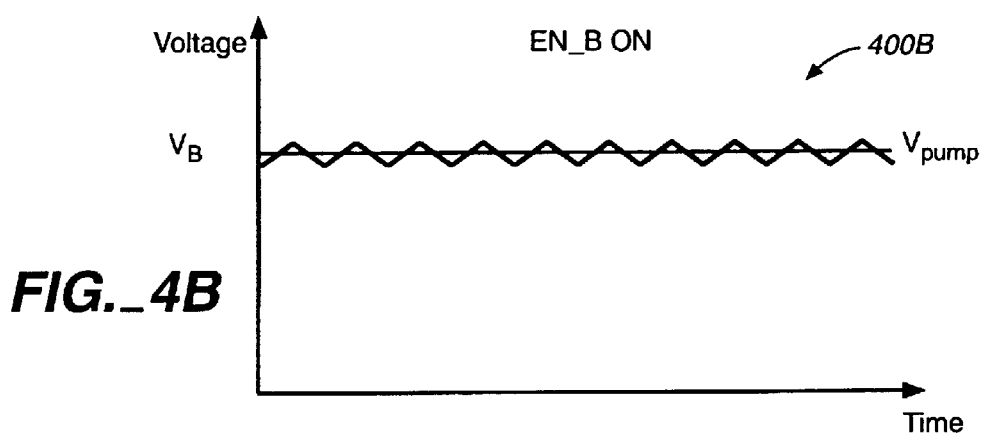
FIG._4B
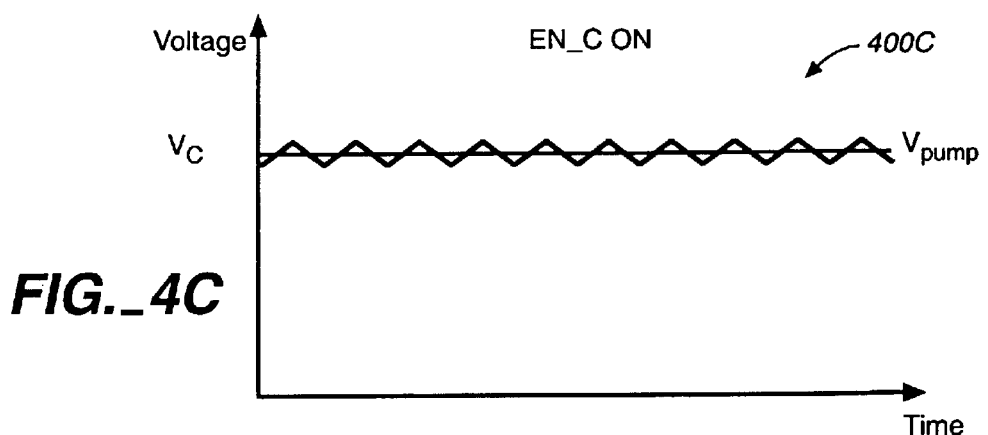
FIG._4C

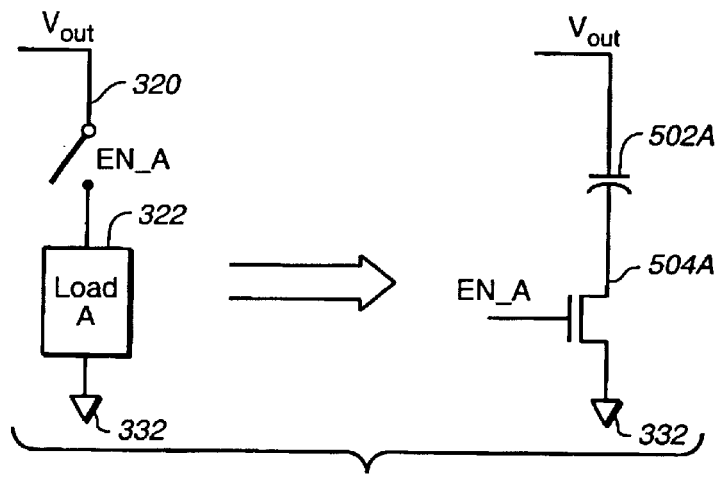
FIG._5A
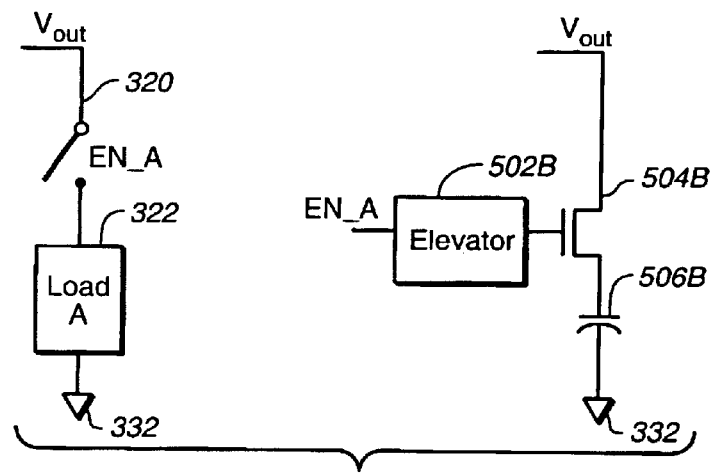
FIG._5B
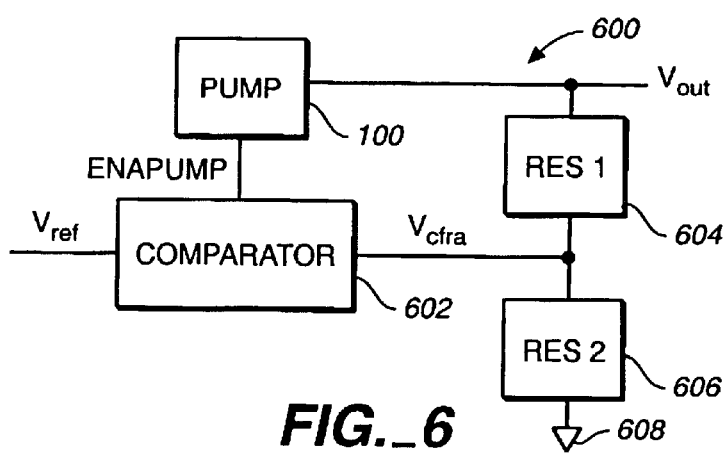
FIG._6

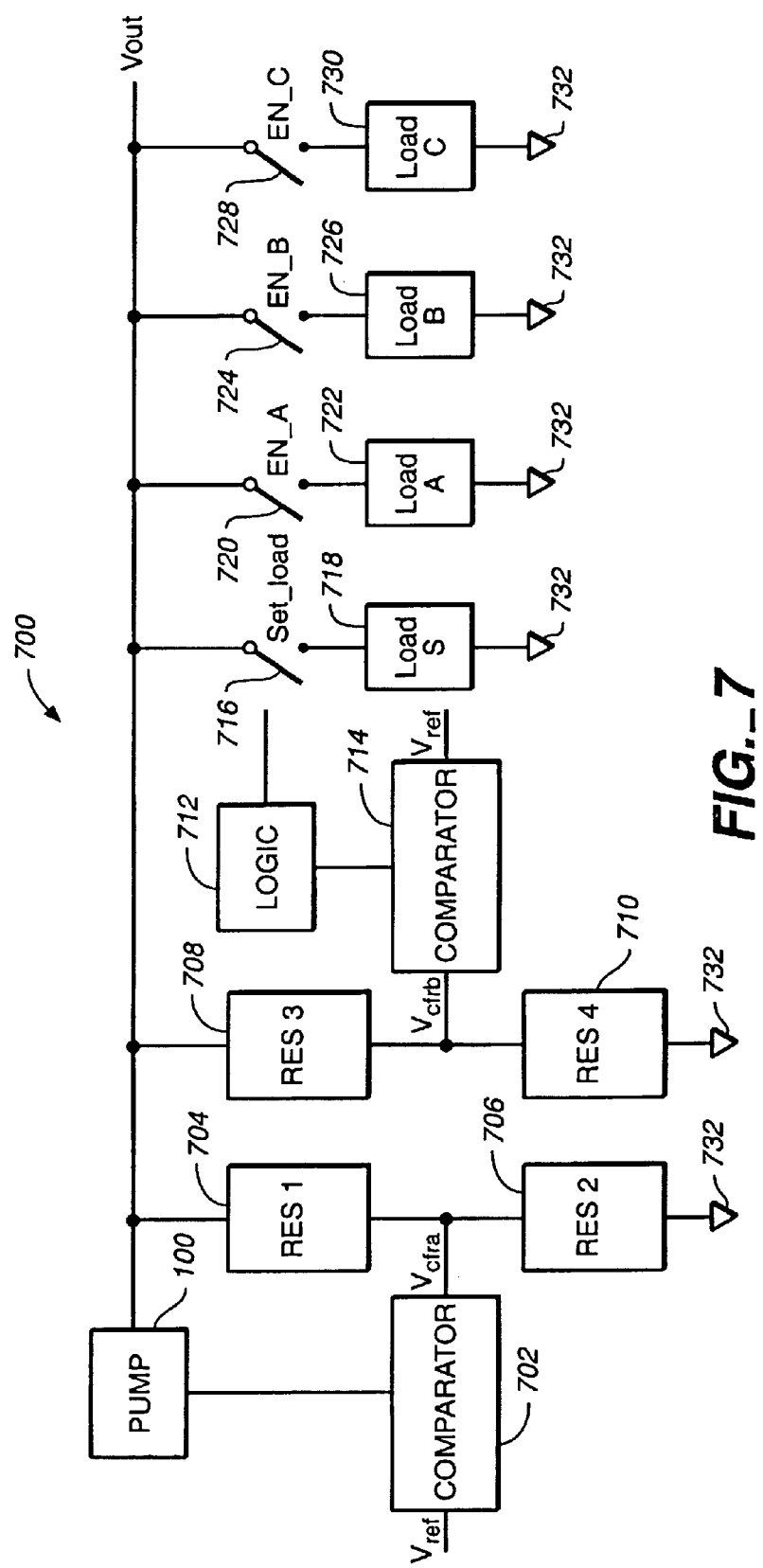
FIG._7

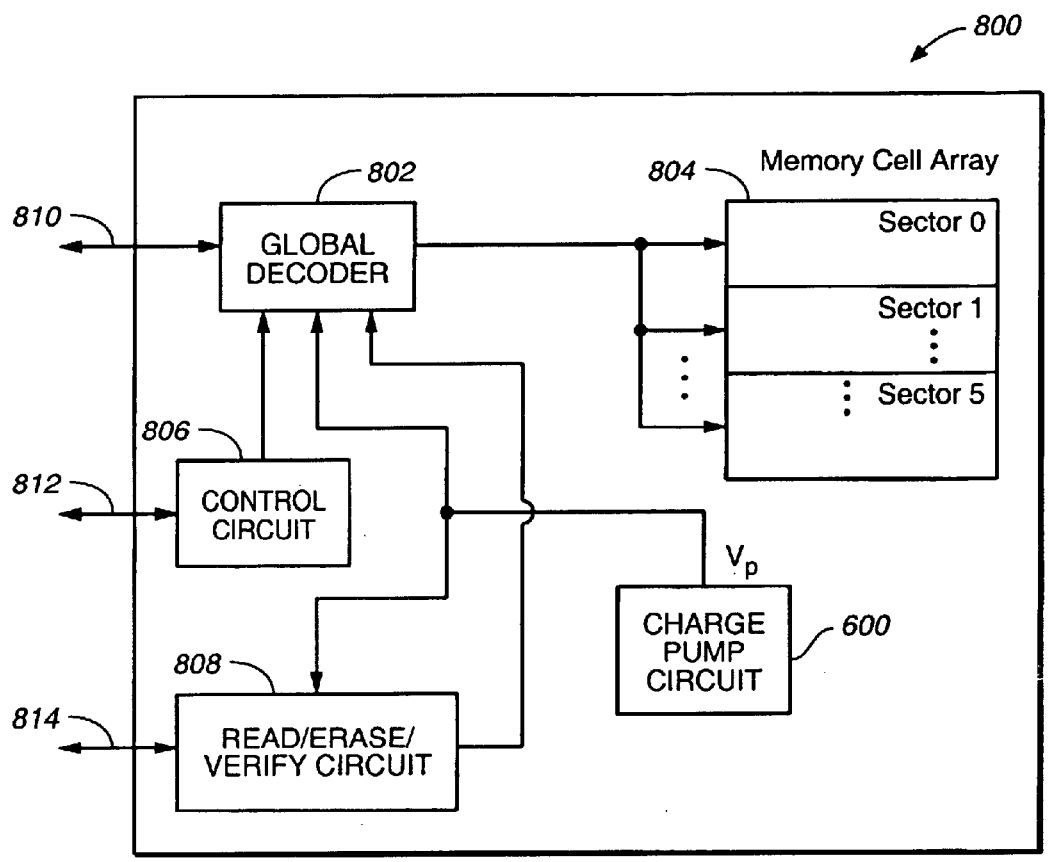
FIG._8
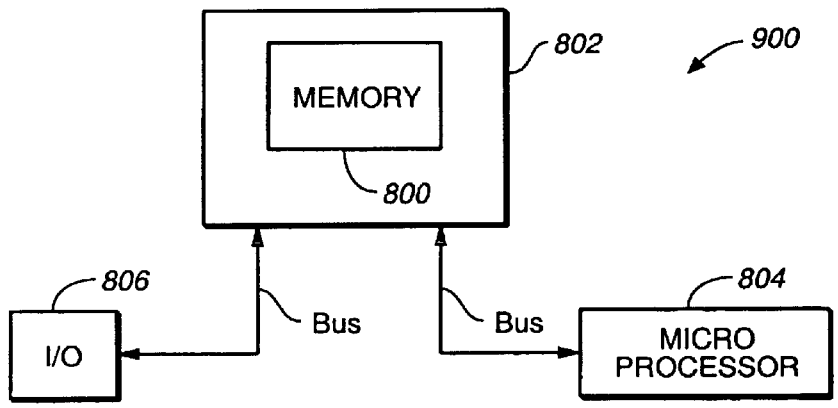
FIG._9

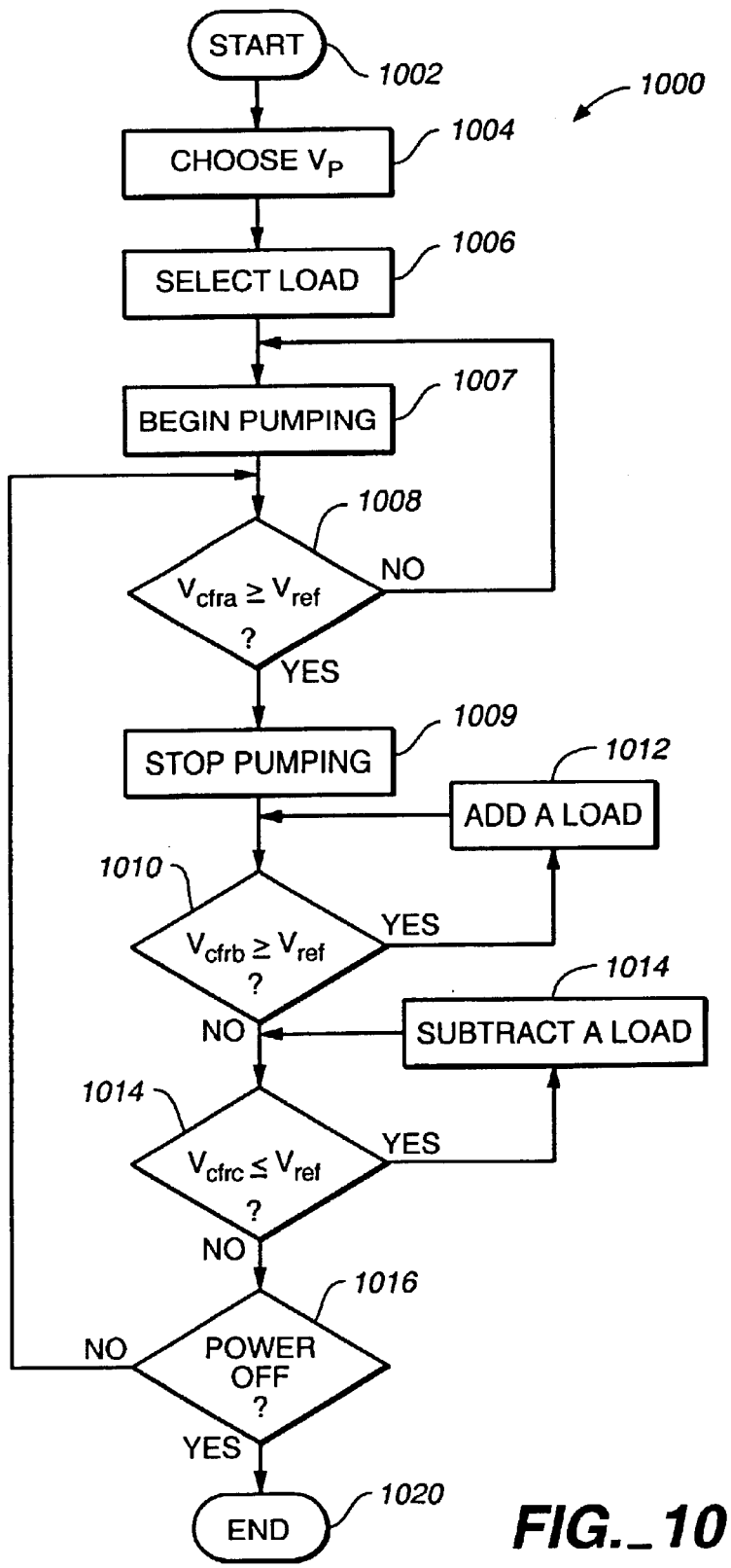
FIG._10

VARIABLE CHARGE PUMP CIRCUIT WITH DYNAMIC LOAD

TECHNICAL FIELD

The present invention relates generally to charge pump circuits and more particularly pertains to variable charge pump circuits adapted for providing any of several target output voltage levels.

BACKGROUND ART

Many types of memory devices require high voltages for reading, programming and erasing instructions. This is true for memory with page, bulk, and sector erases.

The most common approach to generate high internal voltages is to use charge pump circuits to boost a voltage supplied to the memory circuit. A charge pump circuit uses an array of capacitors to increase the supply voltage. A low power source is coupled to a charge pump circuit to generate necessary high voltages for erasing, reading and programming operations in a memory.

FIG. 1 shows a schematic diagram of a typical two-stage charge pump circuit 100 that generates a boosted output voltage $V_{pump}$ with a magnitude that is greater than the magnitude of a supply voltage $V_{cc}$ supplied by a source 102, such as from an external pin of the memory chip. The voltage source 102 is coupled to a first diode-connected NMOS transistor 104. The source of this first NMOS transistor 104 is coupled to a capacitor 106 and to a second diode-connected NMOS transistor 110. The source of the second NMOS transistor 110 is coupled to a second capacitor 108 and to a third NMOS transistor 112. The third transistor 112 has its gate connected to its drain and its source connected to the output voltage $V_{pump}$. The other terminals 114 and 118 of the capacitors 106 and 108 receive respective clock signals CK and CKN of opposite phase. The internal high voltages are obtained by boosting the series of capacitances 106, 108 with the internal supply voltage $V_{cc}$. The capacitors 106 and 108 store and transfer charge at the rate of the clocks. Node A is the junction between the capacitor 106 and the source of the diode-connected NMOS transistor 110. Node B is the junction between the capacitor 108 and the diode-connected NMOS transistor 112. The voltage at node A equals the sum of the voltages of the capacitor 106 and $V_{cc}$. The voltage at node B equals the voltage of the capacitor 108. The output voltage ($V_{pump}$) is the sum of the voltages at nodes A and B. Depending on the efficiency of the charge pump circuit 100, the pump output voltage ($V_{pump}$) is the amount of voltage that the transistor 112 delivers to the output terminal. A first regulator may be provided with feedback from the pump output voltage to rapidly turn the charge pump on and off in order to minimize ripples in the pump output voltage.

In a two-stage charge pump circuit like that shown in FIG. 1, the pump output voltage $V_{pump}$ can be less than the maximum voltage that the charge pump circuit 100 can possibly deliver. For example, the charge pump may be called upon to supply any of several different output voltages ($V_{pump}$), only one of which is near the maximum. More generally, for n-stage pump circuit the maximum pump output ($V_{out,max}$) equals to $(n+1)^* V_{cc}$. The current that the charge pump is able to furnish is $I_{out}=f(V_{dd} \cdot N_P \cdot C_P/N_S \cdot T_{CK})$, when $N_P$ is the number of parallel stages, $N_S$ is the number of series stages, $C_P$ is the capacitance value and $T_{CK}$ is the charge pump clock period. The clock signals CK and CKN define the charge transfer rate from the internal power supply 114. Equivalently, the faster the clock rate, the faster the pump voltage reaches the target voltage.

Usually, a charge pump output ($V_{pump}$) that is significantly less than the maximum output ($V_{max}$) experiences a ripple voltage signal caused by the sharing of charge between the capacitance of the pump circuit and that of the load circuit. The frequency of the ripple voltage coincides with the charge and discharge cycles of the clock. The output voltage rises above (overshoots) the target voltage during a charge cycle, and then drops again as a function of the RC discharge of the load and the load capacitance $C_L$. The level of voltage overshoots is proportional to the difference between the maximum pump output voltage, $V_{max}$ and the pump output ($V_{pump}$). In another word, the voltage overshoot is proportional to the excess charge being dumped into the load capacitance.

This ripple phenomenon is very critical when a charge pump circuit 100 has to provide any of several different regulated $V_{out}$ values. When a single charge pump circuit 100 has to furnish more than one $V_{pump}$ value ranging from a very low to a very high value. In this case, the pump boost capacitor has to be larger in order to guarantee that the charge pump circuit 100 is able to furnish sufficient current at the highest voltage, but is over efficient at furnishing current at very low $V_{pump}$ values, generating in this last case very high ripple. Because the overshoot is due to pure charge sharing between internal pump capacitance and external load, the lower the regulated pump output, the higher the charge sharing and the higher the voltage overshoot.

Referring to FIGS. 2A, 2B and 2C, the graphs of three different pump voltage outputs, VA, VB (=2.VA), and VC (=4.VA), from the same charge pump circuit plotted against time show that $V_{pump}$ and $I_{out}$ are strictly depending on target pump value and charge pump behavior. When charge pump specification such as $V_{max}$ and load$_{max}$ are known, the dimension of the pump can be defined in order to achieve the best efficient pump. The dimension of the pump 100 is identified with minimum consumption, area, and the number of stages. FIG. 2A shows the lowest pump output voltage VA with the highest overshoot problem because the charge pump circuit is over efficient for the given load capacitance. FIG. 2B shows a lower overshoot problem for the higher pump voltage VB because the load is better matched to the pump circuit 100. FIG. 2C shows almost no overshoot problem for the highest pump voltage VC near $V_{max}$, which is the best load match for this charge pump circuit.

In one attempt to solve the overshoot problem in charge pumps, the U.S. Pat. No. 6,370,046 entitled "Ultra-Capacitor Based Dynamically Regulated Charge Pump Power Converter" by Nebrigic et al. (the '046 patent), uses a power converter to provide electrical power by dynamically controlling a switch matrix of the charge pump that includes a flying ultra capacitor. The '046 dynamically provides the power upon demand by sensing the output voltage and changing the operating frequency of the charge pump in response. In particular, the dynamic controller operates a capacitive power output stage to pump charge at a rate to maintain an output voltage $V_{out}$ across a load capacitor. The dynamic controller discharges a fly capacitor into the load capacitor when the output voltage drops below a reference voltage. The closed loop dynamic control allows for maintaining a desired output voltage by charging and discharging the flying ultra capacitor. The '046 patent also discloses a two state controller that switches a flying ultra capacitor at a slow rate to produce increased output power. The two states controller maintains a predetermined voltage ripple across the flying ultra capacitor to attain efficient charge transfer to the output capacitor.

An object of the invention is to provide a charge pump circuit with a minimum-ripple pump output voltage and at the same time maintain the basic structure of charge pump and of regulator.

SUMMARY OF THE INVENTION

The object is met by a charge pump circuit with variable load. The charge pump circuit comprises one or more stages operable to receive a supply voltage and generate one or more pump voltages. A plurality of loads are connectable to the charge pump output, each load associated with a specific target pump voltage. A load selector means couples a selected load to the output according to the target pump voltage.

In conclusion, a new approach to select dynamically the best load for a pump as a function of the target output voltage.

In another embodiment, a regulator may be provided to monitor the output for unacceptable levels of overshoot and attach an additional load in the event such unacceptable overshoot is detected.

BRIEF DESCRIPTION OF THE DRAWINGS

FIG. 1 is a schematic diagram of a three stage charge pump circuit.

FIG. 2A illustrates a response of the charge pump circuit of FIG. 1.

FIG. 2B illustrates another response of the charge pump circuit of FIG. 1.

FIG. 2C illustrates a response of the charge pump circuit of FIG. 1.

FIG. 3 is a schematic diagram of a charge pump circuit according to the present invention.

FIG. 4A is a response of the charge pump circuit of FIG. 3 when EN_A is on.

FIG. 4B is a response of the charge pump circuit of FIG. 3 when EN_B is on.

FIG. 4C is a response of the charge pump circuit of FIG. 3 when EN_C is on.

FIG. 5A is a schematic diagram of an embodiment of the load A of FIG. 3.

FIG. 5B is a schematic diagram of another alternative embodiment of the load A of FIG. 3.

FIG. 6 is a block diagram of an alternative embodiment of the charge pump circuit 300 coupled with a load selector for enabling/disenabling the pump circuit 300 when Vcfra is less than Vref.

FIG. 7 is a block diagram of another embodiment of the charge pump circuit 300.

FIG. 8 is a block diagram of a memory system that uses the charge pump circuit of FIG. 6.

FIG. 9 is a block diagram of a computer system that uses the memory system of FIG. 7.

FIG. 10 is a flow chart of a method for dynamically selecting a best load to reduce the voltage ripples compared to those obtained from the circuit of FIG. 1.

DETAILED DESCRIPTION OF THE PREFERRED EMBODIMENT

With Reference to FIG. 3, a charge pump circuit 300 comprises a pumping circuit including one or more pump stages operable to receive a supply voltage $V_{cc}$ and generate one or more pump voltages. The charge pump circuit 300 is shown with two pump stages, but more generally the charge pump circuit 300 can have n stages, where n>1. The charge pump circuit 300 includes several different loads 322, 326, and 330, each connectable via a respective switch 320, 324, 328 to the output 334 of the charge pump circuit. Depending on the desired pump output $V_{out}$, the switches select an appropriate load associated with a specific pump voltage to result in a minimum voltage ripple.

The pumping circuit includes three diodes 304, 306, and 308 (implemented here as diode-connected n-channel transistors) that are connected in series. The input terminal of the first diode 304 is coupled to a supply voltage $V_{cc}$ 302. The output of the first diode is connected to the input terminal of the second diode 306, and the output terminal of the third diode is connected the output 332 of the charge pump circuit 300.

The charge pump circuit 300 also includes two capacitors 310 and 312, one for each pump stage. A first terminal of the first capacitor 310 is coupled to the output of the first diode 304 and the input of the second diode 306. A first terminal of the second capacitor 312 is coupled to the output of the second diode 306 and the input of the third diode 308. In an n-stage charge pump circuit, a last capacitor is coupled to the input terminal of the last diode.

A clock signal CLK supplied at input 314 is coupled in series with a set of inverters 316 and 318. The output of the first inverter 316 is coupled to a second terminal of the first capacitor 310. The output of the second inverter 318 is coupled to a second terminal of the second capacitor 312. In an n-stage charge pump, additional inverters in the series are connected to the other capacitor stages.

The charge pump circuit 300 of the present invention also includes several different loads 322, 326, and 328. Loads can be capacitors or current sinkers. Each load is associated with a different pump output voltage $V_{out}$. The number of loads provided to the circuit may vary, depending on the number of target pump voltages that can be provided. A given load can be associated to a fixed output voltage or to a small voltage interval. The first load 322 is associated with a pump output voltage VA and is connected to a first switch 320. The first switch is enabled by a control signal EN_A. Similarly, the second load 324 is associated with a pump output voltage VB and is connected to a second switch 324. The second switch 324 is enabled by EN_B. Finally, the third load 330 is associated with a pump output voltage VC and is connected to a switch 328. The third switch 328 is enabled by EN_C. The three switches 320, 324, and 328 together with their respective control signals EN_A, EN_B, and EN_C form a load selector means that reduce voltage ripple at the charge pump output 334 to a minimum.

When an instruction for either VA, VB, or VC is received by a controller (not shown), the controller (not shown) generates the enable control signal EN_A, EN_B or EN_C that selects an appropriate load for this voltage that gives the minimum voltage ripple. Only one load can be selected at a time. For example, if voltage VA is selected, EN_A causes the first switch 320 to close, connecting the first load to the output terminal of the charge pump circuit 300. The remaining loads 326 and 330 are disconnected from the output terminal because their respective switches 324 and 328 are open.

The output of the charge pump circuit 300 is shown in FIG. 4A. There is minimal ripple because the load is matched with the load capacitor 322 of the pumping circuit. In this case, the charge sharing effect, as discussed above, is minimal because of the additional of the selected load A.

Similarly, referring to FIG. 4B, the response of the charge pump circuit 300 is shown when load B 326 in FIG. 3 is selected by means of the second switch 324 being closed by control signal EN_B. When load B 326 is selected load A 320 and load C 330 are disconnected from the output of the charge pump circuit 300. In contrast to the graph 2B of FIG. 2, the voltage ripple of the charge pump output in this case is at minimum because the charge dumped into the load capacitance is significantly reduced because the load provided by load B makes the load of the pump matched to the internal pumping capacitor.

Referring to FIG. 4C, the response of the charge pump circuit 300 is shown when load C 330 in FIG. 3 is selected by means of the third switch 328 being closed by control signal EN_C. When load C 330 is selected load A 322 and load B 326 are disconnected from the output of the charge pump circuit 300. The voltage ripple of the charge pump output in this case is also at minimum because the charge dumped into the load capacitance is significantly reduced because the load capacitance and the internal capacitance are matched.

In reference to FIG. 5A, one embodiment of the EN_A switch 320 and the load A 322 are shown. The switches 324 and 328 are similarly constructed. In this embodiment, the switch EN_A is an NMOS transistor whose gate is connected to the EN_A terminal, whose source is connected to electrical ground 332, and whose drain is connected to a load capacitor 502A. One terminal of the load capacitor 502A is connected to the pump output ($V_{out}$). When voltage VA is selected, the EN_A terminal is HIGH, the NMOS transistor is turned on, connecting the load A to the output ($V_{out}$).

FIG. 5B shows another embodiment of the switch EN_A 320 and the load A 322. In this embodiment the switch EN_A comprises an elevator circuit 502B whose input is connected to the EN_A terminal, and output is connected to the gate of an NMOS transistor 504B. The drain of the NMOS transistor 504B is connected to the pump output ($V_{out}$) and the source is connected to a load capacitor 506B. The second terminal of the load capacitor 506B is connected to the electrical ground 322. When voltage VA is selected, the EN_A terminal is HIGH, the output of the elevator circuit 502B is high. The NMOS transistor is turned on, connecting the load A to the output ($V_{out}$).

Referring to FIG. 6, a simpler controller of the pump output voltage $V_{pump}$ is the charge pump circuit 600. This circuit comprises a pump circuit 100 as described in FIG. 1, a comparator 602, a first resistor network 604 and a second resistor network 606. The charge pump circuit 600 compares a sample of the pump output voltage (Vcfra) to a reference voltage (Vref). Whenever Vcfra is larger than Vref, the comparator 602 disables the pump circuit 100 via an ENAPUMP terminal of the comparator 602.

Referring to FIG. 7, another embodiment of the present invention is shown with the selector means expanded to further compare the maximum acceptable ripple on pump voltage output sampled on node Vcfrb with the reference voltage (Vref). The charge pump circuit 700 includes a pumping circuit 100 as shown in FIG. 1, a first comparator 702 to compare the sampled target pump output (Vcfra) with the reference voltage (Vref), a first resistor 704, a second resistor 706, a third resistor 708, and a fourth resistor 710, a logic circuit 712, a second comparator 714, a set load switch 716 connected to a set load 718, an EN_A switch 720 connected to a load A 722, an EN_B switch 724 connected to load B 726, and an EN_C switch 728 connected to a load C 730. The second terminals of the second resistor 706, the fourth resistor 710, the load S 718, the load A 722, the load B 722, and the load C 730 are connected to an electrical ground 732.

As mentioned above, the first comparator 702 disables the pump 100 whenever the pump output voltage (Vcfra) sampled by means of the first resistive network is greater than the reference voltage (Vref). Otherwise, the first comparator 702 leaves the pump circuit 100 to continue to operate. When the voltage Vcfra is greater than the reference voltage (Vref) the charge pump circuit 700 performs the second test to further minimize the voltage ripple at the pump output ($V_{out}$). The second comparator 714 instructs the logic circuit 712 to add the load S 718 whenever the maximum acceptable ripple on target output sampled at node Vcfrb is greater than the reference voltage (Vref); otherwise, the second comparator 714 leaves the pump circuit 700 to operate without adding any load.

Moreover, an additional feedback circuitry can be implemented to have a direct control on pump output. In this way it is possible to decide the best load also in function of the temperature and supply voltage.

With reference to FIG. 8, a block diagram of a memory system includes the charge pump circuit 600 of FIG. 6. The memory system includes an address decoder 802, control circuit 806, and read/write/erase/verify circuitry 808 coupled to a memory cell array 804. In addition, the address decoder 802 is coupled to an address bus 810, the control circuit 806 is coupled to a control bus 812, and the read/write/erase/verify circuitry 808 is coupled to a data bus 814. The pumped output voltage $V_P$ generated by the charge pump circuit 600 may be applied to number of components within the memory system. In the memory system, the charge pump circuit 600 applies the pumped output voltage to the read/write/erase/verify circuit 808 that may utilize this voltage in a data buffer to enable that buffer to transmit or receive full logic level signals on the data bus. The charge pump circuit 600 also applies the pumped output voltage to the address decoder 802, in turn, may utilize this voltage to apply boosted wordline voltages to the array. In operation, external circuitry, such as processor or memory controller, applies address, data, and control signals on the respective busses 810, 812, 814 to transfer data to and from the memory system 800. When contained in a flash memory, the charge pump circuits 600 would typically receive an external supply voltage $V_{cc}$ and generate a plurality of switchable voltage $V_P$ that are used to perform program and erase operations in blocks of nonvolatile memory cells contained in the array. Each local decoder provided within the memory cell array sectors 0, 1, . . . 5 comprises at least one n-type transistor to pass negative voltage and at least one p-type MOS transistor to pass the positive voltage to an addressed row of that sector.

FIG. 9 is a block diagram of a computer system 900 including computing circuitry 802 that contains the memory device 800 of FIG. 8. The computing circuitry 802 with its associated processor 804 performs various computing functions such as executing specific software to perform specific calculations or tasks. In addition, the computer system includes one or more input devices 806, such as a keyboard or a mouse, coupled to the computer circuit to allow an operator to interface with the computer system. Typically, the computer system also includes on or more output devices coupled to the computer circuitry, such output devices typically being a printer or a video terminal. One or more data storage devices are also typically coupled to the computer circuitry to store data or to retrieve data from external storage media. Examples of typical storage devices include hard and floppy disks, tape cassettes, and compact disc read-only memory (CD-ROM). The computer circuitry is typically coupled to the memory device through appropriate address, data, and control busses to provide for writing data to and reading data from memory device.

Another aspect of the present invention provides a method for achieving minimum voltage ripple of the charge pump operation in a memory device, which may be employed in association with the memory devices and computer system illustrated and described above. Referring to FIG. 10, the flow chart shows a method 1000 usable especially with the circuits of FIGS. 3 and 7 for achieving minimum voltage ripple in the charge pump circuit 600 by dynamically selecting the best load that yield the desired result, including the decision whether to set load S in addition to one of the loads A, B or C. The method begins by choosing a desired output pump voltage (step 1004), selecting a load associated with the selected output pump voltage (step 1006), comparing (step 1008) the target output voltage (Vcfra) to a reference voltage (Vref), comparing (step 1010) the maximum ripple target output voltage (Vcfrb) to the reference voltage (Vref). The resistor network going Vcfrb is made to give Vcfrb<Vcfra for a given output voltage $V_{pump}$. Whenever the target output voltage Vcfra is less than the Vref, else continue the pumping process. Whenever Vcfrb is greater than Vref, adding a load; otherwise, continue to next step. Whenever minimum acceptable overshoot on output pump target Vcfrc is less than Vref (step 1014), removing a load and continue; otherwise continue to see if power is off (step 1016). If power is off then end the charge pump process.

The method 1000 starts at step 1002. The instruction begins and orders the bus controller to instruct the charge pump circuit 600 to begin.

At step 1004, the instruction provides information to the charge pump circuit 600 near the voltage needed at the output node.

At the step 1006, the switch enables a load corresponding to the selected pump voltage by switching on the load that provides the best voltage ripple by means of either EN_A, EN_B, or EN_C function as discussed above. The pumping phase (step 1007) is enabled.

At step 1008, after the pump circuit 600 reaches the desired value, in order to ensure that the pump output is at the right output voltage value, the charge pump circuit measures the pump output against the reference voltage. Whenever the measured pump output voltage (Vcfra) is greater than the reference voltage, it means that there is overshoot (the output voltage is beyond the target voltage). The logic circuit of the charge pump circuit orders the charge pump circuit 600 to halt operation (step 1009). Whenever the measured pump output voltage (Vcfra) is less than the reference voltage, the output is lower than the desired value and, the circuit 600 continues to enable the pumping (step 1007) of the charge pump circuit.

At step 1010, the output voltage (Vcrfb) is compared with the reference voltage (Vref) in order to find out whether voltage overshoots occur. Whenever Vcfrb is greater than or equal to the reference voltage (Vref), it means there are voltage overshoots and the logic goes to the next step.

At step 1012, the circuit 600 adds a load so that voltage ripple can be reduced. This step continues until the voltage ripple is reduced and then the circuit 600 goes to the next step.

At step 1014, the circuit 600 compares the output voltage (Vcfrc) to the reference voltage (Vref) to find if a minimum drop-on the output voltage occurs. For a given $V_{pump}$ the resistor network is made to give Vcfrc>Vcfra. If Vcfrc is strictly lower than the reference voltage (Vref), it means there are voltage undershoots and the logic goes to the next step.

At step 1016, the circuit 600 removes a load so that voltage drop can be reduced. This step continues until the voltage drop is reduced and then the circuit 600 moves to next step.

At step 1016, when the minimum voltage ripple is achieved, the circuit 600 observes if the power is turned off. If the power is not off, the method 1000 repeats steps 1008 to 1016 until the power is off.

At step 1018, when the power is off, the method 1000 ends.

What is claimed is:

1. A charge pump circuit for generating a charge pump voltage having minimal voltage ripples, comprising:
    a) a pumping circuit comprising one or more stages operable to receive a supply voltage and generate a selected one of a plurality of pump voltages;
    b) a plurality of loads selectively coupleable to an output of the pumping circuit, each load associated with a specific pump voltage; and
    c) a load selector means for selectively coupling a load associated with a specific pump voltage to the output of said pumping circuit.

2. The charge pump circuit of claim 1, wherein the load selector means includes a target output pump selector for shutting down the variable charge pump circuit when the target output pump voltage (Vcfra) is greater than or equal to a reference voltage (Vref).

3. The charge pump circuit of claim 2, wherein the load selector means further includes a maximum ripple on the target output selector means for adding a load, whenever a maximum ripple on the target output voltage (Vcfrb) greater than the reference voltage (Vref) then the maximum ripple on the target output selector means adds additional loads until the Vcfrb voltage is less than or equal to the reference voltage (Vref).

4. The charge pump circuit of claim 1, wherein the pumping circuit comprises:
    a) a plurality of diodes coupled in series, each diode having an input terminal and an output terminal, the input terminal of the first diode in the series is coupled to the supply voltage, the output of the first diode being connected to the input terminal of the second diode, and the output terminal of the last diode connected to the output pump;
    b) a plurality of capacitors having a first terminal and a second terminal, wherein the first terminal of the first capacitor being coupled to the output of a first diode and the input of a second diode, the first terminal of the second capacitor being coupled to the output of the second diode and the input of a third diode, and the first terminal of the last capacitor is coupled to the input terminal of a last diode;
    c) a plurality of inverters coupled in series to one another, each having an input terminal and an output terminal, the output of the first inverter being coupled to the second terminal of the first capacitor forming the first stage of the charge pump circuit, the second output of the second inverter coupled to the second terminal of the second capacitor forming the second stage of the charge pump circuit, and the output of the last inverter is coupled to the second terminal of the last capacitor forming the last stage of the charge pump circuit; and d) a clock signal coupled to the input terminal of the first inverter.

5. The variable charge pump circuit of claim 4, wherein each of the plurality of diodes is a diode-connected NMOS transistor, the gate of each transistor being connected to its drain forming the input terminal and its source forming the second terminal.

6. The charge pump circuit of claim 1, wherein the load selector means is a plurality of switches, one switch for each of said loads, each switch having a first terminal, a second terminal, and an enable terminal, the switch being coupled in series with each load, the first terminal of the switch being coupled to the output pump and the second terminal of the switch is coupled to each load.

7. The charge pump circuit of claim 1, wherein each load selector means comprises an NMOS transistor having a gate, a drain and a source, the gate of the NMOS load transistor being coupled to an enable signal, the source of the load NMOS load transistor being coupled to an electrical ground, and the drain being coupled to a load.

8. The charge pump circuit of claim 7, wherein each load is a capacitor or a current sinker having a first terminal and a second terminal, the first terminal being coupled to the pump voltage and the second terminal being coupled to the drain of the NMOS transistor.

9. The charge pump circuit of claim 1 wherein each load selector means comprises an elevator circuit having an input terminal and an output terminal, the input terminal being coupled to an enable signal, the output terminal being coupled to a load NMOS transistor, the gate of the load NMOS transistor being connected to the output terminal of the elevator circuit, the drain of the NMOS transistor being coupled to the pump output, and the source being coupled to the load.

10. The charge pump circuit of claim 9, wherein each load is a capacitor or a current sinker having a first terminal and a second terminal, the first terminal being coupled to the source of the NMOS transistor and the second terminal being coupled to an electrical ground.

11. The charge pump circuit of claim 2 wherein the target output pump selector comprises:
   a) a first comparator having two input terminals, an output terminal and a first enable terminal, one of the two input terminals being connected to the reference voltage (Vref);
   b) a first resistor network having two terminals, the first terminal being coupled to the output pump, the second terminal being coupled to one of the input terminals of the first comparator;
   c) a second resistor network having two terminals, the first terminal being coupled to the second terminal of the first resistor network, and the second terminal of the second resistor network being coupled to an electrical ground; and
   d) a reference voltage source (Vref) coupled to one of the input terminals of the first comparator.

12. The charge pump circuit of claim 11, wherein the maximum overshoot on target output selector means comprises:
   a) a third resistor network having two terminals, the first terminal is coupled to the output pump;
   b) a fourth resistor network having two terminals, the first terminal is coupled to second terminal of the third resistor network, and the second terminal of the fourth resistor network being coupled to an electrical ground;
   c) a second comparator having two input terminal, an output terminal, and an enable terminal, one of the input terminals being coupled to the input terminal of the fourth resistor network and the other of the input terminals being coupled to the reference voltage Vref;
   d) a logic circuit having two terminals, the first terminal is coupled to the output terminal of the second comparator; and
   e) a set load coupled to the pump output and being controlled by the logic circuit for adding an additional load to the output pump when the output pump has an overshoot greater than a maximum allowed on the output terminal.

13. A memory device, comprising:
an address bus;
a control circuit;
a data bus;
an address decoder coupled to the address bus;
a read/write circuit coupled to the data bus;
a memory cell array coupled to the address decoder, control circuit, and read/write circuit; and
a charge pump circuit that generates a boosted output voltage with minimum ripples on an output node coupled to the address decoder, read/write circuit, and memory cell array, the charge pump circuit comprising:
   a) a pumping circuit comprising one or more stages operable to receive a supply voltage and generate one or more pump voltages;
   b) a plurality of loads, each load associated with a specific pump voltage and selectively coupleable to an output of the pump circuit (output pump);
   c) a load selector means coupled to the output pump for selecting a load that satisfies a specific pump voltage;
   d) a target output pump selector sampling the output of the pump circuit for shutting down the variable charge pump circuit whenever the sampled output voltage (vcfra) is greater than or equal to a reference voltage (Vref);
   e) a maximum ripple on target output selector means sampling the output of the pump circuit for adding a load, whenever a maximum ripple on sampled output voltage (Vcfrb) is greater or equal to than the reference voltage (Vref) then the output selector means adds additional loads until the Vcfrb voltage is less than the reference voltage (Vref).

14. A memory system of claim 13, wherein the pumping circuit comprises:
   a) a plurality of diodes coupled in series, each diode having an input terminal and an output terminal, the input terminal of the first diode in the series being coupled to the supply voltage, the output of the first diode being connected to the input terminal of the second diode, and the output terminal of the last diode connected to the output pump voltage;
   b) a plurality of capacitors having a first terminal and a second terminal, wherein the first terminal of the first capacitor being coupled to the output of the first diode, the first terminal of the second capacitor being coupled to the output of the second diode, and the first terminal of the last capacitor being coupled to the input terminal of the last diode;
   c) a plurality of inverter coupled in series to one another, each having an input terminal and an output terminal, the output of the first inverter being coupled to the second terminal of the first capacitor and the input of the second inverter forming the first stage of the charge pump circuit, the second output of the second inverter coupled to the second terminal of the second capacitor forming the second stage of the charge pump circuit, and the output of the last inverter being coupled to the input of the last diode; and d) a clock signal coupled to the input terminal of the first inverter.

15. The memory system of claim 13, wherein the plurality of diodes is a NMOS transistor connected as a diode, the gate of each transistor being connected to its drain forming the input terminal and the source forming the second terminal.

16. The memory system of claim 13, wherein the load selector means is a switch having a first and a second terminal coupled in series with each load, the first terminal of the switch being coupled to the output pump and the second terminal of the switch is coupled to the load.

17. The memory system of claim 13, wherein each load selector means comprises an NMOS transistor having a gain a drain and a source, the gate of the NMOS load transistor being coupled to an enable signal, the source of the load NMOS load transistor being coupled to an electrical ground, and the drain being coupled to a load.

18. The memory system of claim 17, wherein the load is a capacitor having a first terminal and a second terminal, the first terminal being coupled to the pump voltage and the second terminal being coupled to the drain of the NMOS transistor.

19. The memory system of claim 13 wherein each load selector means comprises an elevator circuit having an input terminal and an output terminal, the input terminal being coupled to an enable signal, the output terminal being coupled to a load NMOS transistor, the gate of the load NMOS transistor being connected to the output terminal of the elevator circuit, the drain of the NMOS transistor being coupled to the pump output.

20. The memory system of claim 19, wherein each load is a capacitor having a first terminal and a second terminal, the first terminal being coupled to the source of the NMOS transistor and the second terminal being coupled to an electrical ground.

21. The memory system of claim 13, wherein load selector means comprises:

a) a first comparator having two input terminal, an output terminal and a first enable terminal, one of the two input terminals connected to the reference voltage (Vref);

b) a first resistor network having two terminals, the first terminal being coupled to the output pump, the second terminal being coupled to the output terminal of the first comparator;

c) a second resistor network having two terminals, the first terminal is coupled to the second terminal of the first resistor network, and the second terminal of the second resistor network being coupled to an electrical ground;

d) a third resistor network having two terminals, the first terminal being coupled to the output pump;

e) a fourth resistor network having two terminals, the first terminal being coupled to the second terminal of the third resistor network, the second terminal of the fourth resistor network being coupled to ground;

f) a second comparator having two input terminals, and output terminal and an enable terminal, one of the input terminals being coupled to the input terminal of the fourth resistor network and the other of the input terminals being coupled to the reference voltage Vref; and g) a logic circuit having two terminals, the first terminal coupled to the second comparator.

22. The memory system of claim 21, wherein the pumping circuit comprises:

a) a plurality of capacitors or current sinkers having a first terminal and a second terminal, wherein the first terminal of the first capacitor being coupled to the output of the first diode, the first terminal of the second capacitor being coupled to the output of the second diode, and the first terminal of the last capacitor being coupled to the input terminal of the last diode;

b) a plurality of inverter coupled in series to one another, each having an input terminal and an output terminal, the output of the first inverter being coupled to the second terminal of the first capacitor and the input of the second inverter forming the first stage of the charge pump circuit, the second output of the second inverter coupled to the second terminal of the second capacitor forming the second stage of the charge pump circuit, and the output of the last inverter being coupled to the input of the last diode; and c) a clock signal coupled to the input terminal of the first inverter.

23. The memory system of claim 13, wherein the memory cell is a flash memory cell.

24. A method for generating an output voltage with minimal ripples in a charge pump circuit, comprising:

a) selecting a output pump voltage (Vpump);

b) turning on a load associated with the selected Vpump; and c) comparing a target output voltage (Vcfra) with a reference voltage (Vref) whenever the target output voltage greater than the reference voltage, disabling the charge pump circuit; whenever the target output voltage is less or equal to the voltage reference, leaving the charge pump circuit on.

25. The method of claim 24, further comprises the following steps:

a) comparing a maximum acceptable ripple on output voltage value (Vcfrb) with a reference voltage (Vref) whenever the maximum acceptable ripple output voltage value is greater than the reference voltage, connecting a load until the Vcfrb voltage value is less than or equal to the reference voltage;

b) comparing a minimum acceptable drop on output voltage value (Vcfrc) with the reference voltage(Vref), whenever the minimum acceptable drop on output voltage value is less than the reference voltage, removing a load until the Vcfrc voltage value is greater than the reference voltage.

* * * * *